United States Patent

[11] 3,587,040

[72] Inventor George H. Fathauer
 Decatur, Ill.
[21] Appl. No. 751,772
[22] Filed Aug. 12, 1968
[45] Patented June 22, 1971
[73] Assignee Qonaar Corporation
 Elk Grove Village, Ill.

[54] VEHICLE DETECTOR
 9 Claims, 2 Drawing Figs.
[52] U.S. Cl. .................................................. 340/38
[51] Int. Cl. .................................................. G08g 1/01
[50] Field of Search ........................................ 340/38 L

[56] References Cited
 UNITED STATES PATENTS
 3,266,028 8/1966 Taylor et al. ............. 340/38 (L) X
 3,500,310 3/1970 Marcinkiewicz ............ 340/38

Primary Examiner—William C. Cooper
Attorney—McDougall, Hersh, Scott and Ladd

ABSTRACT: A vehicle detector, comprising a tuned inductive loop adapted to produce a high frequency field which will be disturbed by vehicles entering the field, an oscillator for supplying a high frequency energizing voltage to said loop, a phase detector for comparing the phase of said voltage across said loop with a reference voltage derived from said oscillator, said phase detector being adapted to produce a control signal when the phase of the voltage across said loop is disturbed by the entry of a vehicle into the field around the loop, an amplifier for amplifying said control signal, relay means connected to the output of said amplifier and operable in response to the amplified control signal, said relay means including a time delay circuit for restoring the relay means to its original condition if the vehicle remains in the field of the loop for longer than a predetermined time interval, and electronic means connected to the output of said amplifier for returning said loop in response to slow changes in the inductance of said loop, said electronic means including a gate circuit for preventing the retuning of said loop in response to the movement of a vehicle into the field of said loop.

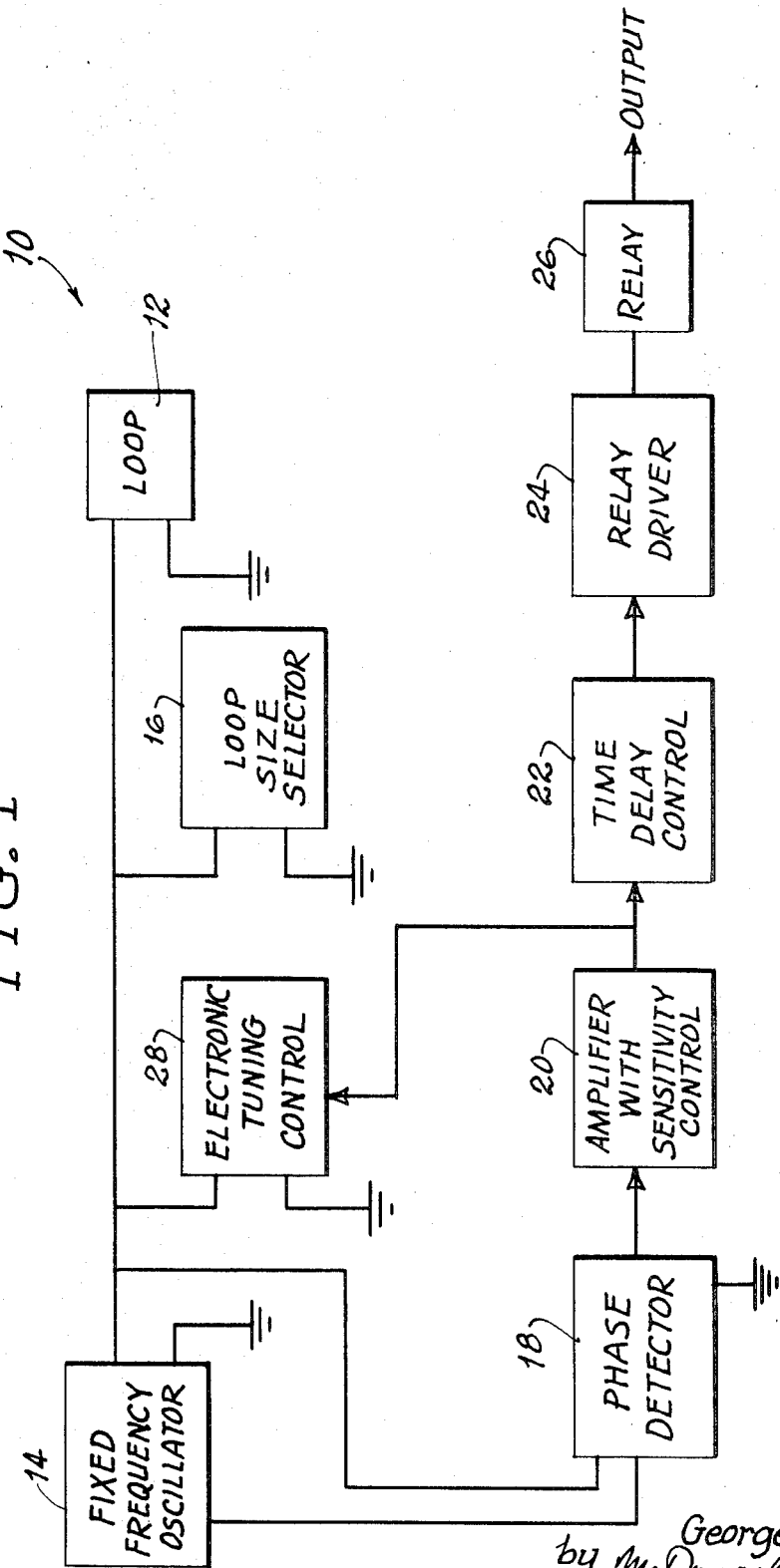

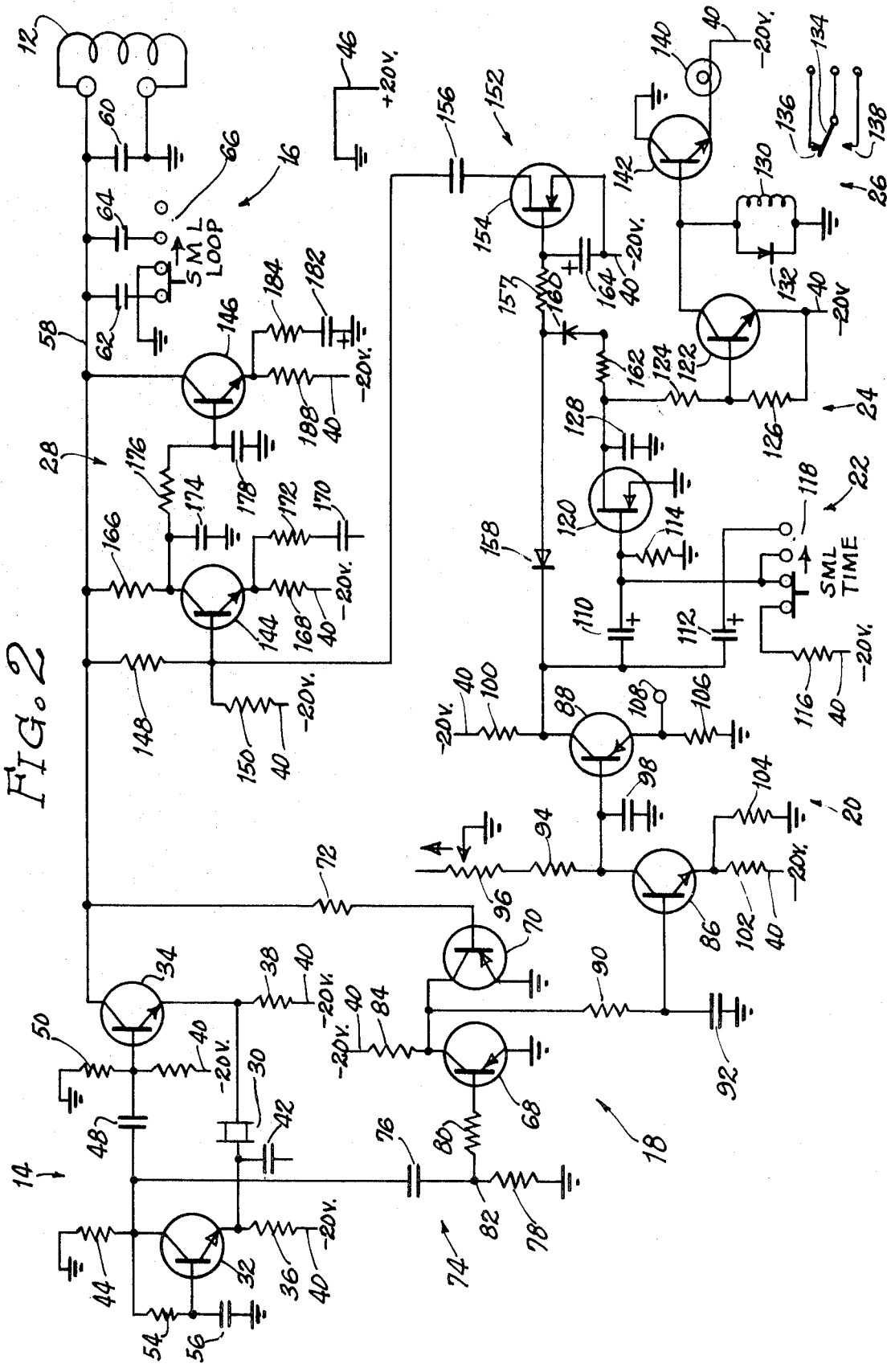

VEHICLE DETECTOR

This invention relates to vehicle detectors, adapted to detect the presence of automobiles, trucks and other vehicles. Such vehicle detectors find many uses. For example, vehicle detectors may be employed to control the operation of traffic signals, particularly at intersections between heavily traveled roads and crossroads with much less traffic. At such intersection, the traffic signals may be arranged to show green signals on the main road, and red signals on the crossroad, at all times, unless a vehicle approaches the intersection on the crossroad. The presence of the vehicle is then detected by the vehicle detector, which causes the traffic lights to go through a brief green signal on the crossroad. In this way, traffic on the main road is not held up unless traffic actually approaches the intersection on the crossroad. Other applications of vehicle detectors will be well known to those skilled in the art.

One object of the present invention is to provide a highly sensitive and reliable vehicle detector of the type utilizing a tuned inductive loop, adapted to produce a high frequency magnetic field which is disturbed when a vehicle enters the field. The loop may be buried under a road or alongside the pavement of the road, so that the field of the loop will be disturbed by passing vehicles.

A further object is to provide a new and improved vehicle detector having means for electronically tuning the loop to the frequency of the energizing voltage so that the loop will be retuned automatically when it becomes detuned due to atmospheric changes and other factors, such as rain, snow, and extremes of temperature, for example.

In this connection, it is another object of the present invention to provide an electronic tuning device having means to prevent retuning of the loop due to the entry of a vehicle into the field of the loop.

A further object is to provide a vehicle detector having means for producing a signal in response to the arrival of a vehicle in the field of the loop, together with a timing device for restoring such means to its original condition, if the vehicle remains in the field for longer than a predetermined interval. This arrangement enables the vehicle detector to be restored to an operative condition if a vehicle is disabled while it remains in the field of the loop.

In accordance with the present invention, these objects are achieved by an electronic vehicle detector which preferably comprises a tuned inductive loop, an energizing generator for supplying a high frequency energizing voltage to the loop, a phase detector for comparing the phase of the loop voltage with the phase of a reference voltage derived directly from the generator, said phase detector being adapted to produce a control signal when the phase of the loop voltage is disturbed by a vehicle entering the field of the loop, output signal means operable in response to the control signal from said phase detector, and an electronic retuning device connected to said loop and operable by a small control signal of long duration for retuning the loop to compensate for slow changes in the inductance thereof. The output signal means preferably includes a timing device for restoring the output signal means to its original condition if the vehicle remains in the field of the loop for an excessive period of time. The electronic retuning device preferably includes gate means to prevent the retuning of the loop in response to control signals produced by vehicles entering the field of the loop.

Further objects, advantages and features of the present invention will appear from the following description, taken with the accompanying drawings, in which:

FIG. 1 is a block diagram, illustrating a vehicle detector to be described as an illustrative embodiment of the present invention.

FIG. 2 is a schematic wiring diagram of the vehicle detector.

As just indicated, the drawings illustrate a vehicle detector 10, of the type comprising an inductive loop 12, adapted to produce a high frequency magnetic field, which will be disturbed by an automobile or other vehicle, entering such field. The loop 12 is supplied with a high frequency energizing voltage, provided by a suitable generator, which in this instance comprises a fixed frequency oscillator 14. It is preferred to tune the loop so that it is resonant at the frequency of the energizing voltage. In order to accommodate loops of widely different sizes, the vehicle detector 10 preferably comprises a loop size selector 16 which can be operated to accommodate wide differences in the inductance of the loop.

When a vehicle enters the high frequency magnetic field produced by the loop 12, the metal components of the vehicle disturb the field so as to reduce the effective inductance of the loop 12. The change in the inductance of the loop disturbs the phase of the voltage across the loop. This disturbance is detected by a phase detector 18, which compares the phase of the loop voltage with the phase of a reference voltage described directly from the oscillator 14. The phase detector produces a variable control signal, having a magnitude which depends upon the size and construction of the vehicle.

An amplifier 20 is preferably provided to amplify the control signal. In the illustrated arrangement, the amplified control signal is then fed through a time delay control device 22 and a relay driver 24 to an output relay 26, adapted to control the operation of traffic signals or the like. The time delay control device 22 eventually restores the relay 26 to its original condition, if the vehicle remains in the field of the loop 12 for an excessive period of time. This arrangement prevents a stalled vehicle from rendering the vehicle detector completely inoperative.

After initial tuning, the loop 12 is subject to slow variations in its inductance, due to atmospheric conditions and other factors, such as rain, snow and temperature changes. The vehicle detector 10 is preferably provided with an electronic retuning control 28 which tunes the loop 12 initially, and also is effective to return the loop 12, in response to the development of a small but sustained control signal by the phase detector 18. The amplified control signal is supplied to the retuning control 28 from the output of the amplifier 20. Any small, sustained change in the inductance of the loop 12 is effectively tuned out by the retuning control 28. In this way, the sensitivity of the vehicle detector 10 is maintained, despite variations in the inductance of the loop 12, due to atmospheric conditions and similar factors.

The electronic retuning control 28 comprises means to prevent the retuning of the loop 12, due to the control signals which are developed by the phase detector 18 when vehicles enter the field of the loop. Thus, the retuning control 28 effectively discriminates between the vehicle signals and the small signals due to slow change in the inductance of the loop 12.

Further details of the vehicle detector will be evident from FIG. 2. In this case, the fixed frequency oscillator 14 is of the type utilizing a crystal 30 to establish the frequency of oscillation. A suitable frequency is about 100 kilocycles per second, but, of course, the frequency may be widely varied.

The illustrated oscillator 14 employs two transistors 32 and 34. The crystal 30 is connected between the emitters of the two transistors. Resistors 36 and 38 extend between the respective emitters and a negative power supply lead or terminal 40. As shown, the power is supplied at about minus 20 volts but any suitable voltage may be employed. In the illustrated circuit, a capacitor 42 of small value is connected between the emitter of the transistor 32 and ground.

A load resistor 44 is connected between the collector of the first transistor 32 and ground. The positive power supply lead 46 is connected to ground, so that the collector is connected to the positive supply lead 46 through the load resistor 44.

It will be seen that a coupling capacitor 48 is connected between the collector of the first transistor 32 and the base of the second transistor 34. A base return resistor 50 is connected between the base and ground. The bias on the base is established by a resistor 52 connected between the base and the negative power supply lead 40.

A base return resistor 54 is connected between the base and collector of the first transistor 32. A bypass capacitor 56 is connected between the base and ground.

The crystal 30, the transistor 32, the capacitor 48 and the transistor 34 form a feedback loop so that oscillations are produced in the circuit, at the resonant frequency of the crystal 30. One side of the loop 12 is connected to a line 58 which leads to the collector of the second transistor 34. The other side of the loop 12 is grounded. Thus, the output of the transistor 34 is supplied to the loop 12.

To assist in tuning the loop 12 to resonance at the frequency of the energizing signal supplied by the oscillator 14, a capacitor 60 is connected across the loop 12.

As already indicated, the loop size selector 16 is provided to accommodate loops of widely different sizes. As shown in FIG. 2, the loop size selector 16 comprises two additional capacitors 62 and 64, together with a three-position switch 66, whereby the capacitors 62 and 64 may be connected in parallel with the capacitor 60. The three-positions of the switch 66 are designated S for small, M for medium and L for large, indicating the size of the loop which is to be accommodated. In the first position, designated S, the capacitor 62 is connected in parallel with the capacitor 60. In the second position, designated M, the capacitor 64 is connected in parallel with the capacitor 60. In the third position, designated L, neither capacitor 62 or 64 is utilized The capacitor 62 has a larger value than the capacitor 64, to compensate for a smaller loop.

The loop 12 develops a high frequency magnetic field which is disturbed by any vehicle which may enter the field. The metal parts of the vehicle have the effect of reducing the effective inductance of the loop 12. Thus, the loop is detuned from resonance, so that the phase of the voltage across the loop is changed.

The phase detector 18 produces a control signal in response to any such change in the phase of the loop voltage. The phase of the loop voltage is compared with the phase of a reference voltage, derived directly from the oscillator 14, in this case from the collector of the first transistor 32. The phase of such reference voltage is not disturbed by changes in the inductance of the loop 12.

The phase detector 18 may assume various forms, but is illustrated as comprising two transistors 68 and 70. The loop voltage is applied to the base of the second transistor 70 by connecting a resistor 72 between the line 58 and the base. A phase shifting circuit 74 is preferably employed to apply the reference voltage to the base of the first transistor 68. Thus, a phase shifting capacitor 76 and a resistor 78 are connected in series between the collector of the first transistor 32 and ground. A resistor 80 is connected between the base of the transistor 68 and the junction 82 between the capacitor 76 and the resistor 78. The phase shifting circuit 74 advances the phase of the reference voltage, as applied to the base of the transistor 68 by somewhat less than 90°.

The collectors of both transistors 68 and 70 have a common load resistor 84, connected between both collectors and the negative power supply terminal 40. The emitters of both transistors 68 and 70 are grounded.

The high frequency signals applied to the bases of the transistors 68 and 70 are sufficient to overdrive the transistors, so that the combined signal at the collectors of the transistors is in the form of a square wave which varies in duration, in accordance with variations in the phase of the voltage across the loop 12. Thus, the square wave signal has a variable direct current component, which is utilized as the control signal. The direct current component becomes more negative when a vehicle enters the field of the loop 12.

As previously indicated, the control signal is preferably amplified by the amplifier 20. In this case, the amplifier comprises two transistors 86 and 88. The control signal is applied to the base of the first transistor 86, through a filtering resistor 90, connected between such base and the collectors of the phase detecting transistors 68 and 70. A filtering capacitor 92 is connected between the base of the transistor 6 and ground. The resistor 90 and the capacitor 92 filter out most of the alternating current component of the signal developed by the phase detector 18.

To provide a sensitivity control, a fixed resistor 94 and a variable resistor 96 is connected in series between the collector of the first transistor 86 and ground. The resistor 96 may be varied to change the gain of the amplifier 20. The collector of the first transistor 86 is connected directly to the base of the second transistor 88. It will be seen that a filtering capacitor 98 is connected between the base of the second transistor 88 and ground, to reduce any remaining alternating current component of the control signal.

A load resistor 100 is connected between the collector of the second transistor 88 and the negative power supply terminal 40. Thus, the output of the amplifier 20 is developed at the collector of the transistor 88.

Biasing resistors 102 and 104 are connected to the emitters of the transistor 86. The resistor 102 is connected to the negative power supply terminal 40, while the resistor 104 is connected to ground. Thus, a negative biasing voltage is established on the emitter.

A biasing resistor 106 is connected between the emitter of the transistor 88 and ground. In this case, a test point or terminal 108 is connected to the emitter.

It will be noted that the amplifying transistors 86 and 88 are of opposite types. Thus, the transistor 86 is of the NPN type, while the transistor 88 is of the PNP type.

As previously indicated, the output of the amplifier 20 is connected through the item delay control 22 and the relay driver 24 to the relay 26. In the detailed arrangement of FIG. 2, the time delay control 22 comprises two coupling capacitors 110 and 112, two resistors 114 and 116, and a three-position switch 118. The positions of the switch are designated S, M and L, representing small, medium and large, with reference to the magnitude of the time delay.

The relay driver 24 preferably comprises a field effect transistor 120, which is also involved in the time delay control 22. Thus, the resistor 114 is connected between the gate of the filed effect transistor (FET) 120 and ground. The first coupling capacitor 110 is connected between the collector of the amplifying transistor 88 and the gate of the FET 120. The capacitor 110 and the resistor 114 have sufficiently large values to provide a fairly long time constant. When the switch 118 is in its M position, only the capacitor 110 and the resistor 114 are in the circuit. When the switch is moved to its L position, the capacitor 112 is connected in parallel with the capacitor 110 to provide a longer time constant. When the switch 118 is in its S position, the resistor 116 is connected between the gate of the FET 120 and the negative power supply terminal 40, so as to provide a shorter time constant. When he capacitor 110 and 112 are charging, the gate of the FET 120 is reversely biased and is nonconductive, so that the FET does not affect the time constant.

The amplified control signal at the collector of the transistor 88 is capacitively coupled to the gate of the FET 120, through the capacitor 110, and also through the capacitor 110 through the resistor 114. Normally, the vehicle signal is of short duration, in which case the charging of the capacitor 110 is insubstantial. However, if the vehicle is stopped in the field of the loop 12 for an excessive period of time, the capacitor 110 becomes fully charged, so that the control signal at the gate of the FET 120 drops to O. This has the effect of restoring the relay 26 to its original condition, so that the vehicle detector is again receptive to an additional vehicle signal.

When the switch 118 is in its L position, a longer period of time is required to charge the capacitors 110 and 112, so that the vehicle may remain in the field of the loop 112 for a longer period to time before the capacitors become charged. When the switch 118 is in its S position, the capacitor 110 is charged in a shorter period of time, through the resistor 116.

The output of the FET 120 is coupled to a driving transistor 122. Thus, the train electrode of the FET 120 is connected to the base of the transistor 112 through a resistor 124. A load resistor 126 is connected between the base and the negative power supply lead 40. It will be seen that the source electrode of the FET 120 is grounded and thus is connected to the positive power supply lead 46. A bypass capacitor 128 is connected between the drain electrode of the FET 120 and ground.

As shown in FIG. 2, the relay 26 comprises a coil 130 which is connected between the collector of the transitor 122 and ground. A reversely connected diode 132 is connected across the relay coil 130 to reduce the transient voltage across the coil when the coil is deenergized. The emitter of the transistor 122 is connected directly to the negative power supply lead 40.

As shown, the relay 26 comprises a contact 134 which is movable between contacts 136 and 138, to produce a single pole, double throw, switching action.

It is desirable to provide a lamp 140 to indicate the condition of the relay circuit. As shown, a transistor 142 is provided to operate the lamp 140, which is connected between the emitter of the transistor and the negative power supply lead 40. The collector of the transistor 142 is grounded. The base is connected to the collector of the transistor 122. When a vehicle is detected, the transistor 142 becomes conductive, so that the lamp 140 is lighted.

In the illustrated circuit, the relay coil 130 is energized under initial conditions before any vehicle is detected. The detection of a vehicle causes deenergization of the relay coil 130. The amplified control signal from the amplifier 20 renders the FET 120 substantially nonconductive. As a result, the voltage across the resistor 126 drops substantially to 0, so that the the transistor 122 is rendered nonconductive.

The electronic retuning control 28 is also responsive to the output of the amplifier 20. However, the arrangement is such that the control signals produced by vehicles do not affect the electronic retuning control 28. Instead, the electronic retuning control is responsive to small control signals which develop gradually, due to slow changes in the inductance of the loop 12. Such changes may be produced by rain, snow, temperature variations and other factors. The vehicle signals are developed much more rapidly and are much greater in amplitude than the signals which actuate the electronic retuning control 28.

The electronic retuning control 2 preferably comprises two transistors 144 and 146 which are arranged so that the transistor 146 is adapted to draw a reactive current from the line 5. Both the magnitude and the phase of the reactive current are variable, to provide a wide range of tuning.

The first transistor 144 derives its input signal from the line 58. Thus, a coupling resistor 148 is connected between the line 58 and the base of the transistor 144. Another resistor 150 is connected between the base and the negative power supply terminal 40, so as to produce a biasing voltage on the base.

A control circuit 152 is provided to vary the magnitude of the input signal at the base of the transistor 144, in response to the control signal delivered by the amplifier 20. In this case, the control circuit comprises a field effect transistor 154 having its drain electrode coupled to the base of the transistor 144 through a blocking capacitor 156. The source electrode of the FET 154 is connected to the negative power supply lead 40. The FET 154 acts in the manner of a variable resistance responsive to the voltage on the gate of the FET. When the resistance of the FET 154 is low, the input signal at the base of the transistor 144 is effectively bypassed to the power supply lead 40 which is at ground potential for alternating current. When the resistance of the FET 154 is large, the input signal at the base of the transistor 144 is large, as determined by the voltage dividing action of the resistors 148 and 150.

The gate of the FET 154 is connected to the collector of the amplifying transistor 88, preferably through a resistor 157 and a gating diode 158. Another gating diode 160 is connected between the anode of the diode 158 and the drain of the FET 120, through a high value resistor 162. It will be seen that a storage capacitor 164 is connected between the gate and the source electrode of the FET 154.

The diodes 158 and 160 act in conjunction with the FET 120 to provide a gating action. Under steady state conditions, the transistor 88 and the FET 120 are both conductive. The collector of the transistor 88 is at a moderate negative voltage, while the drain of the FET 120 is at a low negative voltage, nearly O. Thus, the drain of the FET 120 is positive relative to the collector of the transistor 88. It will be seen that the diodes 15 and 160 are polarized so as to be conductive under these conditions. The high value resistor 162 limits the current through the diodes 158 and 160. Inasmuch as the diode 158 is conductive, any small and gradual change in the voltage at the collector of the transistor 88 is transmitted to the gate of the FET 154 through the resistor 157, so as to initiate the retuning action.

However, an abrupt control signal of greater magnitude is produced at the collector of the transistor 88 when a vehicle enters the field of the loop 12. The control signal causes the FET 120 to become nonconductive. Accordingly, the drain electrode of the FET 120 goes to nearly the full negative power supply voltage, so that the drain is now negative with respect to the collector of the transistor 88. Accordingly, both diodes 158 and 160 become nonconductive. This action effectively disconnects the gate of the FET 154 from the collector of the transistor 88. The resistor 157 prevents any substantial charging of the capacitor 164 by the vehicle detection signal before the diodes 158 and 160 become nonconductive. The storage capacitor 164 maintains the gate of the FET 154 at the voltage which existed thereon when the diodes 158 and 160 became nonconductive. Thus, the vehicle detection control signal is prevented from affecting the electronic retuning circuit 28.

The first transistor 144 of the retuning circuit 128 acts initially as an amplifier. Thus, a load resistor 166 is connected between the collector of the transistor 144 and the line 58, which is connected to ground through the loop 12. A biasing resistor 168 is connected between the emitter of the transistor 144 and the negative supply lead 40. A bypass capacitor 170 and a resistor 172 are connected in series between the emitter and ground. The resistor 172 introduces a certain amount of degeneration into the amplifier circuit.

A phase shifting capacitor 174 is connected between the collector of the transistor 144 and ground. An additional phase shift is produced by a resistor 176, connected between the collector of the transistor 144 and the base of the transistor 146, in conjunction with a capacitor 178, connected between the base and ground.

It will be seen that the collector of the second transistor 146 is connected directly to the line 58. A biasing resistor 180 is connected between the emitter of the transistor 146 and the negative supply lead 40. A bypass capacitor 182 and a resistor 184 are connected in series between the emitter and ground. Here again, the resistor 184 introduces a certain amount of degeneration.

Due to the phase shifting action of the resistors 166 and 176 and the capacitors 174 and 178 the transistor 146 draws a reactive current from the line 58. The phase and magnitude of the reactive current are variable in accordance with the magnitude of the input signal to the base of the transistor 144. When the input signal is O or nearly so, due to low resistance condition of the FET 154, the transistor 144 is substantially passive, so that the high frequency signal is supplied to the base of the transistor 146 from the line 58, through the resistors 166 and 176, acting in conjunction with the capacitors 174 and 178 to shift the phase of the signal. The voltage across the capacitor 178 is retarded in phase relative to the voltage on the line 58. When the input signal to the base of the transistor 144 is high, due to a high resistance condition of the FET 154, the amplifying action of the transistor 144 produces a high frequency signal of greater magnitude at the oscillator of the transistor 144. Moreover, the phase of such greater signal is displaced by 180°from the phase of the signal on the line 58. Accordingly, the phase of the signal across the capacitor 178 is advanced relative to the phase on the line 58.

Thus, when the input signal to the transistor 144 is O, the transistor 146 draws a lagging reactive current from the line 58. When the input signal to the transistor 144 is at a maximum, the transistor 146 draws a leading current. In this way, a wide tuning range is achieved by the electronic tuning control 28.

While the operation of the vehicle detector has already been described, it may be helpful to offer a brief summary. Initially the loop 12 is connected between the line 58 and ground, and the switch 66 is adjusted to its small, medium, or large position, in accordance with the size of the loop.

The oscillator 14 supplies a high frequency energizing voltage to the loop. This energizing voltage may be at 100 kilocycles per second or some other suitable frequency.

The electronic tuning control 28 performs an initial fine tuning operation, so that the loop 12 is tuned to resonance at the frequency of the energizing voltage. Thus, if the loop 12 is slightly off resonance, the phase detector 18 develops a control signal which is amplified by the amplifier 20. This signal changes the resistance of the field effect transistor 154, so as to vary the input signal to the base of the transistor 144. The electronic tuning control 28 completes a negative feedback loop, so that the tuning control stabilizes in a condition in which the reactive current drawn by the transistor 146 is of a magnitude and phase to bring the loop 12 substantially to resonance.

Any vehicle which enters the high frequency magnetic field of the loop will disturb the field in such a way as to reduce the effective inductance of the loop 12. Accordingly, the loop is detuned from resonance. This changes the phase of the voltage across the loop.

The phase detector 18 compares the phase of the loop voltage with the phase of the reference voltage derived from the collector of the transistor 32 in the oscillator circuit 14. When the vehicle disturbs the phase of the loop voltage, the phase detector 18 develops a negative-going control signal which is amplified by the direct coupled amplifier 20. The amplified control signal is capacitively coupled to the field effect transistor 120, which thereupon becomes substantially nonconductive. As a result, the relay driving transistor 122 also becomes nonconductive, so that the relay coil 130 is deenergized. Accordingly, the movable contact 134 transfers between the contacts 138 and 136. This transfer may be employed to operate a traffic signal, or any other suitable device. The transistor 142 becomes conductive, so that the signal lamp 140 is lighted, to indicate that a vehicle has been detected.

The gating diodes 158 and 160 prevent the vehicle responsive control signal from affecting the electronic tuning control 28. When the FET 120 becomes nonconductive, the full negative power supply voltage is applied to the drain electrode of the FET 120, so that the diodes are reversely biased through the resistor 162. Accordingly, the gate of the field effect transistor 154 is effectively disconnected from the collector of the amplifying transistor 88. The storage capacitor 164 maintains the gate at its previous voltage, so that the timing of the electronic unit 28 remains unchanged.

Normally, the vehicle will move out of the field of the loop 12 after a short time. In that case, the coupling capacitor 110 discharges rapidly through the gate of the FET 120, so that the vehicle detector makes a quick recovery to its initial condition. However, if the vehicle remains in the field of the loop for an excessive period of time, the coupling capacitor 110 becomes fully charged through the resistor 114. If the time delay switch 22 is in its long position, the capacitor 112 is also in the circuit, so that a considerably longer period of time is required before both capacitors 110 and 112 become charged. If, on the other hand, the switch 22 is in its short position, the capacitor 110 charges more rapidly through the resistor 116, as well as the resistor 114.

When the capacitor 110 becomes fully charged, the control signal at the gate of the FET 120 drops to 0, so that the FET becomes conductive. Accordingly, the relay driving transistor 122 also becomes conductive, with the result that the relay coil 130 is energized. Thus, the relay is restored to its initial condition.

When the FET 120 becomes conductive, the negative voltage at its drain electrode drops to a low value, near 0, with the result that the diodes 158 and 160 are now biased in a forward direction so that they become conductive. Accordingly, the control signal is fed from the collector of the transistor 88 to the gate of the FET 154. As a result, the loop 12 is retuned by the electronic tuning circuit 28, so as to tune out the effect of the vehicle remaining in the field of the loop. In this way, the vehicle detector is restored to its fully operative condition, in which it is capable of detecting any other vehicle which enters the field of the loop 12. When the stalled vehicle departs from the field of the loop 12, the electronic tuning unit 28 again retunes the loop to resonance.

The sensitivity of the vehicle detector may be varied by adjusting the resistor 96. In this way, it is possible to reduce the sensitivity, so that the vehicle detector will respond to automobiles, trucks and other large vehicles, but not to bicycles and the like. Alternatively, the sensitivity may be increased so that the detector will respond to both small and large vehicles, having any substantial amount of metal thereon.

It will be evident that the vehicle detector is versatile and highly reliable. Nevertheless, the vehicle detector may be manufactured at low cost.

Those skilled in the art will understand that the values of the various components, employed in the illustrative embodiment may be varied widely to suit various conditions. For the sake of complete understanding, however, it may be helpful to offer the following table, showing one set of appropriate values, by way of example:

| Resistor: | Value in ohms |
|---|---|
| 36 | 4.7K |
| 38 | 470 |
| 44 | 4.7K |
| 50 | 68K |
| 52 | 33K |
| 54 | 47K |
| 72 | 1.8K |
| 78 | 1.8K |
| 80 | 1K |
| 84 | 4.7K |
| 90 | 10K |
| 94 | 1K |
| 96 | (variable) 10K |
| 100 | 4.7K |
| 102 | 1.2K |
| 104 | 680 |
| 106 | 1K |
| 114 | 22M |
| 116 | 1M |
| 124 | 10K |
| 126 | 10K |
| 148 | 100K |
| 150 | 180K |
| 157 | 22M |
| 162 | 2.2M |
| 166 | 4.7K |
| 168 | 10K |
| 172 | 470 |
| 176 | 4.7K |
| 180 | 470 |
| 184 | 33 |

| Capacitor: | Value in microfarads [1] |
|---|---|
| 42 | pf 470 |
| 48 | .001 |
| 56 | .01 |
| 60 | .027 |
| 62 | .027 |
| 64 | .015 |
| 76 | pf 470 |
| 92 | .047 |
| 98 | .001 |
| 110 | 1.0 |
| 112 | 33 |
| 128 | .22 |
| 156 | .01 |
| 164 | 4.7 |
| 170 | .22 |
| 174 | pf 470 |
| 178 | pf 470 |
| 182 | 4.7 |

[1] Unless otherwise marked or in picofarads (pf.).

Various other modifications, alternative constructions and equivalents may be employed without departing from the true spirit and scope of the invention, as exemplified in the foregoing description and defined in the following claims.

I claim:

1. A vehicle detector, comprising
an inductive loop,
a high frequency generator for supplying an energizing voltage to said loop,
a phase detector having first and second inputs,
a first output from said generator for applying the energizing voltage to said loop and to said first input whereby the phase of the voltage applied to said first input is influenced by changes in inductance of said loop,
a second output for directly applying said energizing voltage to said second input to thereby provide a reference voltage at said second input,
said phase detector producing a control signal in response to any change in the phase of the voltage at said first input,
a third output means operable in response to said control signal from said phase detector,
and retuning means for utilizing the output of said phase detector to retune the inductive loop to compensate for long term changes in the inductance thereof.

2. A vehicle detector according to claim 1, including means for preventing the vehicle detection control signal from operating said retuning means.

3. A vehicle detector according to claim 1, including gating means operable in response to the detection control signal for effectively disconnecting said retuning means from said phase detector to prevent said vehicle detection control signal from actuating said retuning means.

4. A vehicle detector according to claim 3,
in which said gating means includes a gating diode connected between said phase detector and said retuning means,
and means operable by the vehicle detection control signal for reversely biasing said gating diode to render it nonconductive.

5. A vehicle detector according to claim 3,
in which said gating means comprises a gating diode, and means including a field effect transistor for reversely biasing said gating diode in response to the vehicle detection control signal to render said diode nonconductive.

6. A vehicle detector according to claim 3,
in which said retuning means comprises a field effect transistor having its control electrode connected to said gating means,
and a storage capacitor connected to said control electrode for maintaining the voltage on said control electrode when said gating means is operative to disconnect said field effect transistor from said phase detector.

7. A vehicle detector according to claim 3,
including timing means for restoring said gating means to its original condition after a predetermined time interval whereby said retuning means will be effective to tune out the vehicle detection control signal if the vehicle remains in the field of the loop beyond said time interval.

8. A vehicle detector according to claim 1,
including gating means operable by the vehicle detection control signal for preventing the vehicle detection control signal from actuating the retuning means.

9. A vehicle detector according to claim 8,
in which said timing means is constructed and arranged to restore said gating means to its initial condition after the predetermined time interval whereby said retuning means will then tune out the vehicle detection control signal so that the vehicle detector will be fully operative to detect another vehicle.